UNITED STATES PATENT OFFICE.

ANDREW C. FRESHOUR AND GEORGE W. LAKE, OF MARION, INDIANA.

ROOFING-PAINT.

SPECIFICATION forming part of Letters Patent No. 415,966, dated November 26, 1889.

Application filed July 31, 1889. Serial No. 319,300. (No specimens.)

*To all whom it may concern:*

Be it known that we, ANDREW C. FRESHOUR and GEORGE W. LAKE, citizens of the United States, residing at Marion, in the county of Grant and State of Indiana, have invented certain new and useful Improvements in Roofing Paints or Compounds; and we do hereby declare the following to be a full, clear, and exact description of the invention, such as will enable others skilled in the art to which it appertains to make and use the same.

This invention relates to certain new and useful improvements in roofing paints or compounds; and it consists in the combination, in certain proportions, of coal-tar, yellow ocher, litharge, fine salt, and turpentine, substantially as will hereinafter be more particularly described and claimed.

There have been many former inventions for roofing paints or compounds, and, while many of them possess valuable properties by which the roof will be protected from leakage and cracking for a long time, they are nevertheless expensive, and in many instances they are very difficult to mix or compound, as well as to apply to the roof.

Further inventions on the subject have been devised, which, while easily mixed or compounded and applied to the roof, are in many instances ineffectual in preventing leakage and cracking of the roof.

A series of practical tests made by us has demonstrated the fact that a mixture of the ingredients herein named, in the proportions and in the manner herein specified, produces a compound or paint capable of long wear and one that can be easily compounded and quickly applied.

In carrying our invention into effect we take about fifty (50) gallons of coal-tar, fifteen (15) pounds of yellow ocher, eight (8) pounds of litharge, five (5) pounds fine salt, and one (1) gallon of turpentine. These ingredients are simply placed together in any suitable vessel and thoroughly mixed or commingled by stirring until brought to the proper consistency and color.

The manner of applying the mixture or compound is by use of a brush in the usual well-known manner.

The above proportions of the several ingredients may be varied somewhat, and consequently we do not wish to be understood as limiting ourselves precisely thereto; but we have found that from such proportions as we do give the most beneficial results are obtained.

Having thus described our invention, what we claim as new, and desire to secure by Letters Patent, is—

In a roofing paint or compound, a mixture consisting of coal-tar, fifty gallons; yellow ocher, fifteen pounds; litharge, eight pounds; fine salt, five pounds, and turpentine, one gallon, the whole being combined substantially as described.

In testimony whereof we affix our signatures in presence of two witnesses.

ANDREW C. FRESHOUR.
GEORGE W. LAKE.

Witnesses:
C. C. GORDON,
WILSON A. ADINGTON.